(12) United States Patent
Cobb

(10) Patent No.: US 6,488,303 B1
(45) Date of Patent: Dec. 3, 2002

(54) COLLAPSIBLE SUSPENSION SLIDER PIN

(75) Inventor: Bruce V. Cobb, Livonia, MI (US)

(73) Assignee: Meritor Suspension Systems Company, Troy, MI (US)

( * ) Notice: Subject to any disclaimer, the term of this patent is extended or adjusted under 35 U.S.C. 154(b) by 88 days.

(21) Appl. No.: 09/735,584

(22) Filed: Nov. 12, 2000

Related U.S. Application Data

(63) Continuation-in-part of application No. 09/198,656, filed on Nov. 24, 1998.

(51) Int. Cl.[7] ............................................. B62D 53/06
(52) U.S. Cl. ............................. 280/407.1; 280/149.2; 280/405.1; 180/209
(58) Field of Search ............................... 280/676, 149.2, 280/407.1, 405.1; 180/209; 279/2.02, 2.03, 2.04; 403/240, 243, 248

(56) References Cited

U.S. PATENT DOCUMENTS

| | | | | | |
|---|---|---|---|---|---|
| 5,564,727 A | * | 10/1996 | Wessels | ................... | 280/407.1 |
| 5,642,896 A | * | 7/1997 | Pierce et al. | ............. | 280/149.2 |
| 5,813,682 A | * | 9/1998 | Stevens | ................... | 280/149.2 |
| 6,279,932 B1 | * | 8/2001 | White et al. | ............. | 280/149.2 |
| 6,279,933 B1 | * | 8/2001 | Ross et al. | ............... | 280/149.2 |
| 6,322,091 B1 | * | 11/2001 | Lindley | ................... | 280/149.2 |
| 2001/0019196 A1 | * | 9/2001 | Eckelberry et al. | ...... | 280/149.2 |
| 2002/0030341 A1 | * | 3/2002 | Eckelberry et al. | ...... | 280/149.2 |

\* cited by examiner

Primary Examiner—Brian L. Johnson
Assistant Examiner—J. Allen Shriver
(74) Attorney, Agent, or Firm—Carlson, Gaskey & Olds

(57) ABSTRACT

An improved suspension system includes a plurality of slider pins which are biased radially outwardly into engagement with openings in the suspension rails of the suspension system and the mating openings in the slider rail. The slider pins are provided with spring clamp structure and a wedged surface. The wedged surface forces the spring clamp radially outwardly into engagement with the openings in the suspension rails to secure the slider pins. Upon withdrawal of the slider pins, the spring clamp is biased radially inwardly to facilitate removal.

13 Claims, 3 Drawing Sheets

COLLAPSIBLE SUSPENSION SLIDER PIN

This application is a continuation in part of co-pending Ser. No. 09/198,656, filed Nov. 24, 1998.

BACKGROUND OF THE INVENTION

This invention relates to a slider pin for a vehicle trailer suspension system that collapses to facilitate insertion or removal.

Trailer suspension systems are typically comprised of a pair of slider rails that carry the suspension system, axles and wheels. A number of slider pins are movable through the slider rails to move into openings on the trailer. By removing the pins, the suspension system may be adjusted along the length of the trailer as is necessary for the particular driving operation. As an example, during highway driving, it may be desirable to have the suspension system spaced more towards the rear of the trailer, while on city streets, it may be desirable to have the suspension system positioned more forwardly. The operator must remove the slider pins and move the location of the suspension system along the trailer to change the location.

Cam operated rods are turned by a handle to advance or withdraw slider pins from the openings in the trailer. Typically, a single handle may be rotated to turn a central rod which turns a cam and moves a linkage associated with each of the slider pins. In the prior art, the slider pins have been of approximately the same size as the holes in the slider rail and the trailer to insure a secure connection. These pins are thus tightly wedged into the holes. The prior art has typically utilized a manually actuated handle for turning the rod and withdrawing the linkages. The manual applied systems have been somewhat difficult to use in that the tightly wedged pins may sometimes be difficult to withdraw.

More recently, powered actuators have been utilized. However, a powered actuator requires an additional element and associated controls, and thus is somewhat undesirable.

SUMMARY OF THE INVENTION

In a disclosed embodiment of this invention, a manually operated slider pin actuation system is provided with a mechanism such that upon actuation of a withdraw of the slider pin collapses. More particularly, the diameter of the slider pin decreases such that the slider pin is no longer wedged into the opening. In this way, the slider pin is easily removable.

The inventive slider pin comprises, in one embodiment, a wedge surface at a forward end of the slider pin movable through a spring clamp. The spring clamp is preferably formed of chuck jaws spring biased inwardly against the wedge surface. As the wedge surface moves to insert the pin, the chuck jaws expand radially outwardly to engage the interior of the openings. On the other hand, upon initiation of withdrawal, the initial movement will be of the slider pin relative to the chuck jaws. The wedge surface withdraws allowing the chuck jaws to move radially inwardly. Now, the pins are not wedged in the openings.

In one embodiment, a jaw collar is positioned on the collar members to assist in holding the collar members during the movement of the slider pin to the locked position.

These and other features of the present invention can be best understood from the following specification and drawings, the following of which is a brief description.

DETAILED DESCRIPTION OF A PREFERRED EMBODIMENT

Figure 1:
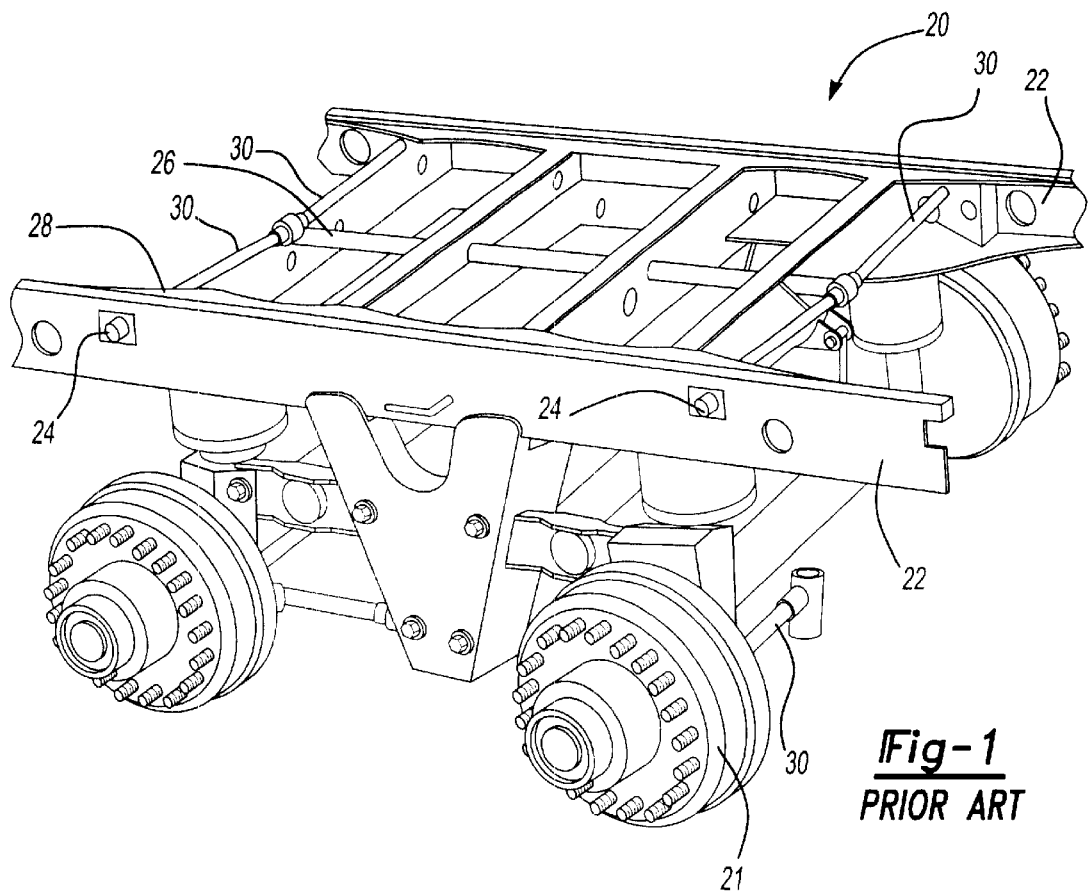
FIG. 1 shows a trailer suspension system.

FIG. 1 shows a prior art suspension system 20 incorporating wheel hubs 21, suspension system 23, and spaced slider rails 22. As is known, this mechanism will be movable along the length of the trailer for adjustment. The wheels are omitted in FIG. 1 such that the detail of the overall system can be better seen. A plurality of slider pins 24 are movable relative to the rails 22, and into openings in the trailer slider rail to attach the system 20 at any number of locations along a trailer.

A cam rod 26 is turned through a known mechanism by a handle 28 to advance and withdraw linkages 30. The linkages 30 may be associated with both slider rails 22, and at both forward and rear ends of the system 20. Thus, by turning the handle 28, the rod 26 turns, and the linkages 30 at all four locations either advanced or withdrawn. As the linkages 30 move, the pins 24 are also advanced or withdrawn. The structure to this point is all known in the prior art, and has the problems as discussed above.

Figure 2A:
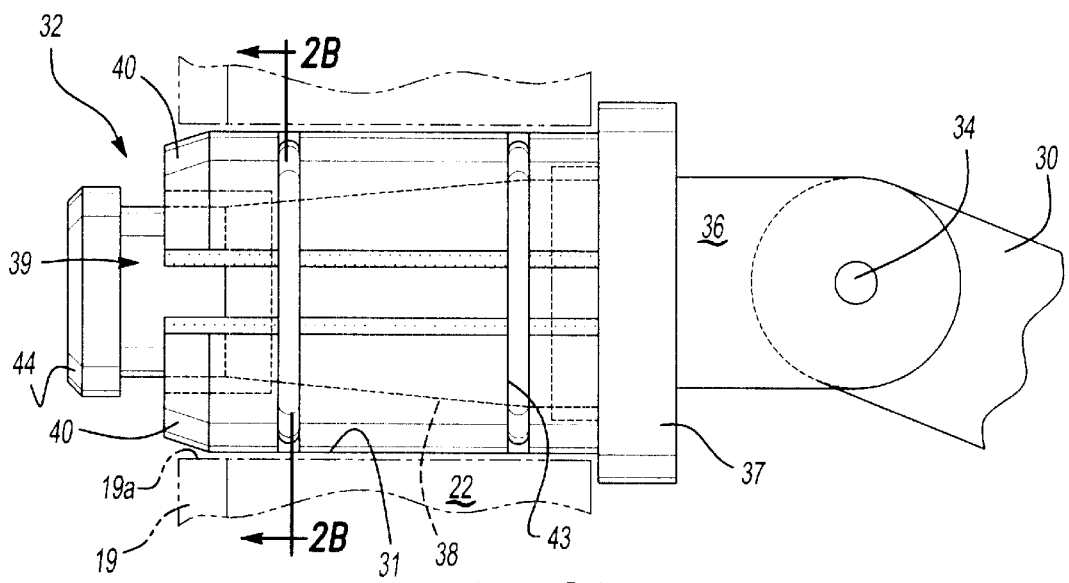
FIG. 2A shows the inventive slider pin construction in the engaged position.

FIG. 2A shows an inventive system 32. The linkage 30 is connected at a pivot pin 34 to the slider pin 36. The pivoting point 34 is also part of the known prior art. The trailer rail wall 19 is shown schematically with the pin in the trailer rail opening 19A in wall 19.

The slider pin 36 and its associated mechanism are the inventive aspects of this invention. A forward block 37 is formed integrally with the slider pin 36. A intermediate wedge portion 38 is also formed integrally with the slider pin 36 and extends to a head 44. The slider pin assembly 36, 37, 38, 44 all move relative to a spring clamp 39. The spring clamp 39 includes multiple chuck jaws 40 which are spring biased by springs 42 radially inwardly. Such chuck jaws are known in other applications. Essentially, the chuck jaws include channels 43 which receive the springs 42 such that multiple opposed chuck jaws are biased radially inwardly against an underlying surface.

Figure 2B:
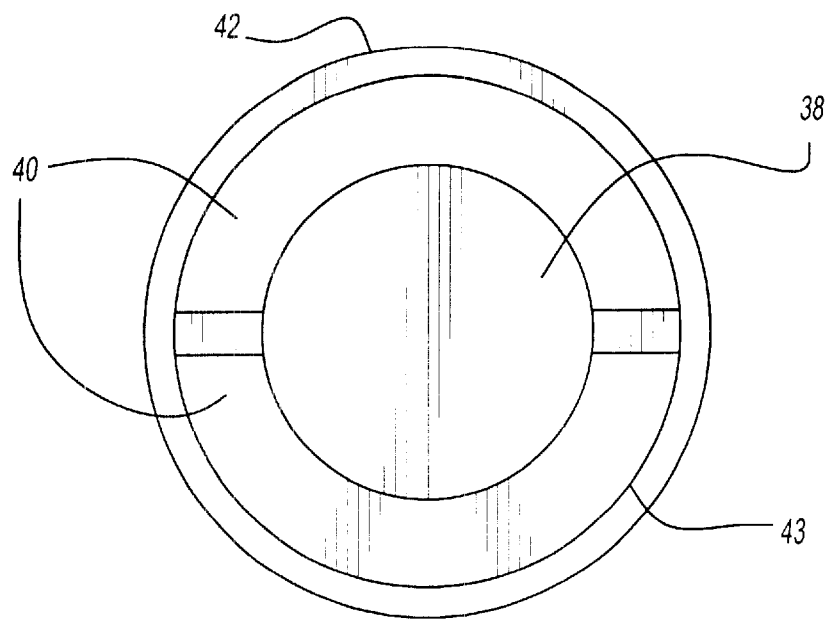
FIG. 2B is a cross-section along line 2B—2B of FIG. 2A.

FIG. 2b shows a front view of the chuck jaws 40. The chuck jaws 40 are preferably formed of a suitable metal, such as steel.

As shown in FIG. 2a, the slider pin 36 is advanced into an opening 19A in the trailer rail 19. The head 44 has moved beyond the chuck jaws 40. When the chuck jaws 40 have been forced outwardly by the ramp surface 38 such that they engage the interior of the surface 31, the slider pin mechanism 32 is locked within the opening 31 and the mating opening 19A in the trailer rail 19.

Figure 3:
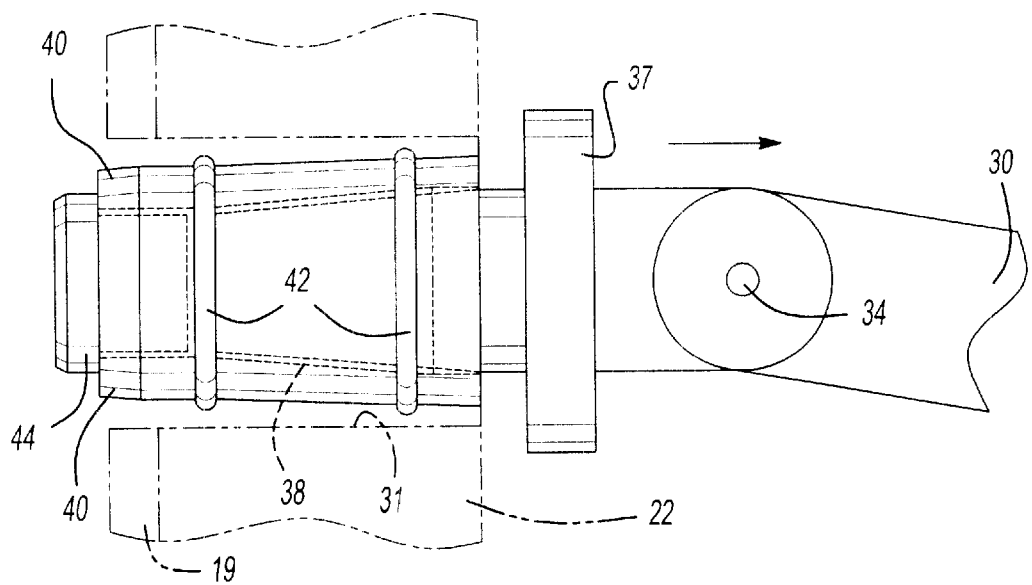
FIG. 3 shows the initial step in withdrawal of the inventive slider pin system.

FIG. 3 shows the first step in removal of the slider pin. As shown, the linkage 30 has moved to draw the pivot point 34 to the right as shown in FIG. 3. With this movement, the initial movement is of the block 37 away from the chuck jaws 40. The chuck jaws 40 will initially not move with the slider pin 36 since there is frictional engagement with chuck jaws and the interior of surface 31. The wedge 38 then moves to the right relative to the spring clamp 39 such that a smaller diameter portion is now presented to the spring clamp 39. At that point, the spring clamp 39 has its diameter decreased since the springs 42 bias the chuck jaws 40 radially inwardly. As shown in FIG. 3, at this point, the slider pin mechanism 32 is no longer in contact with the inner diameter 31 of the opening of the slider rail 22 or the trailer rail 19. As can be appreciated, the mechanism will now be easily withdrawn.

Figure 4:
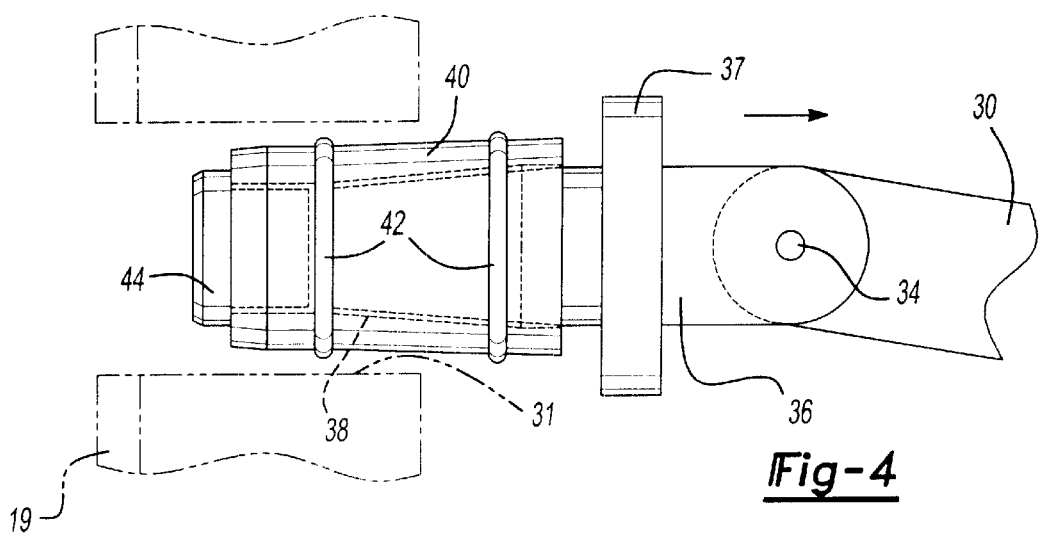
FIG. 4 shows the subsequent step in the withdrawal of the slider pin system.

As shown at the point in FIG. 3, the head 44 has now moved far enough to the right such that it has contacted the chuck-halves 40. With further movement, as shown in FIG. 4, the head 44 withdraws the spring clamp 39 along with the slider pin 36 out of the trailer rail 19. This allows the adjustment of the suspension system as known.

Figure 5:
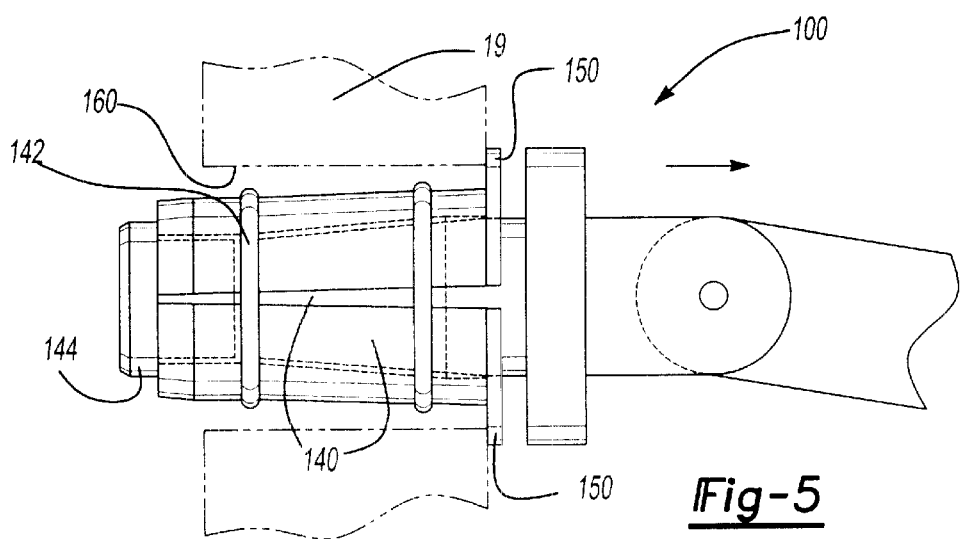
FIG. 5 shows a further embodiment.
Figure 6:
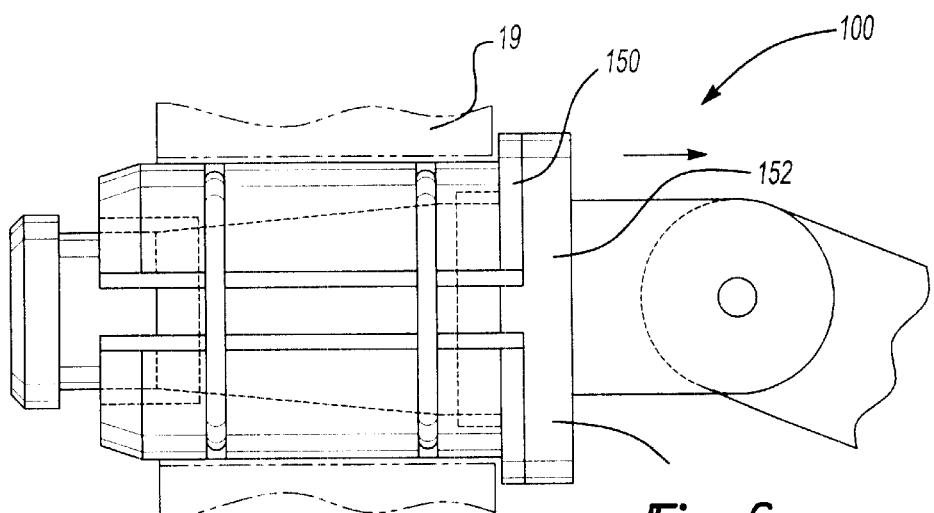
FIG. 6 shows the unlocked position of the further embodiment.

Another embodiment 100 is illustrated in FIGS. 5 and 6. In this embodiment the chuck-halves 140, are still held by the springs 142 downwardly against the pin structure 144. While the prior pin structure may be held during movement of the pin within the hole in the trailer rail 19 due to friction, gravity, or any other of many forces, and further due to dimensional design considerations, in this embodiment a collar 150 is provided on the chuck-halves 140. In the locked position, the collar 150 abuts an outer face of the trailer rail 19. When the pin is moved to its retraced position, the collar is initially still held within the hole 160 due to friction. Thus, in the movement from the position of FIG. 5 to the FIG. 6 position, friction holds the collar for sufficient time such that the pin can pull outwardly and allow the collar to move to its retracted position such as shown in FIG. 6. It should be understood, the collar and pin may then be moved completely out of the hole 160 in the slider rail between the trailer rail 19.

When moving back to the locked position, the collar 150 will initially contact the outer surface of the slider rail, and prevent further inward movement of the chuck-halves 140 once it has reached the FIG. 6 position. Also an enlarged portion 152 of the pin contacts collar 150. Further inward movement of the pin will thus force the chuck-halves 140 radially outwardly to the locked position of FIG. 5.

Essentially, the present invention provides a very simplified mechanism for reducing the force required to withdraw the slider pins. The benefits of this invention are that it decreases the complexity and force required to adjust a suspension system.

Although a preferred embodiment has been disclosed, it should be understood that a worker of ordinary skill in this art would recognize that modifications come within the scope of this invention. For that reason, the following claims should be studied to determine the true scope and content of this invention.

What is claimed is:

1. A suspension system comprising:

a pair of opposed suspension rails;

an axle suspension system connecting at least a pair of spaced axles and a plurality of wheel hubs;

a plurality of slider pins actuatable between a movable mechanical mechanism for moving relative to a plurality of openings in said suspension rails; and said slider pins each being constructed such that the size of said slider pins may be reduced upon actuation of said mechanical mechanism, said slider pins including a structure which is biased inwardly such that when said mechanical mechanism moves, said slider pins are biased between enlarged and reduced outer diameters.

2. A system as recited in claim 1, wherein said slider pins are generally cylindrical.

3. A mechanism as recited in claim 2, wherein said slider pins are provided with a wedged surface, and said wedged surface causes a second portion of said mechanical mechanism to increase or decrease the diameter of said slider pin.

4. A suspension system comprising:

a pair of opposed suspension rails;

an axle suspension system connecting at least a pair of spaced axles and a plurality of wheel hubs;

a plurality of slider pins actuatable between a movable mechanical mechanism for moving relative to a plurality of openings in said suspension rails; and said slider pins each being constructed such that the size of said slider pins may be reduced upon actuation of said mechanical mechanism;

said slider pins being provided with a wedged surface, and said wedged surface causes a second portion of said mechanism to increase or decrease the diameter of said slider pin;

said slider pins include at least a pair of spaced chuck jaws spring biased radially inwardly against said wedged surface.

5. A system as recited in claim 4, where there are a pair of enlarged portions on each side of said wedged surface, and said enlarged portions abut and move said chuck-halves after an amount of movement without abutment of either of said enlarged portions.

6. A system as recited in claim 4, wherein said chuck jaws have collars which will abut an outer surface of said suspension rails to define an inwardly extended position for the chuck-halves.

7. A suspension system comprising:

a pair of opposed slider rails;

an axle suspension system connecting at least a pair of spaced axles to said slider rails;

a plurality of slider pins actuatable by a mechanical mechanism for moving relative to a plurality of openings in said slider rails; and said slider pins being constructed such that the diameter of said slider pins may be reduced upon actuation of said actuation mechanism, by movement of a wedged portion within an engagement portion which is spring biased radially inwardly against said wedged portion.

8. A system as recited in claim 7, wherein said slider pins are generally cylindrical.

9. A system as recited in claim 7, wherein said slider pins are provided with a wedged surface, and said wedged surface causes a second portion of said mechanism to increase or decrease the diameter of said slider pin.

10. A system as recited in claim 7, wherein said slider pins include at least a pair of spaced chuck jaws spring biased radially inwardly against said wedged surface.

11. A system as recited in claim 9, where there are a pair of enlarged portions on each side of said wedged surface, and said enlarged portions abut and move said slider pins after an amount of movement without abutment of either of said enlarged portions.

12. A system as recited in claim 10, wherein said chuck jaws have collars which will abut an outer surface of said suspension rails to define an inwardly extending furthest most position for the chuck-halves.

13. A trailer suspension system comprising:

a handle to be manipulated to advance or withdraw a plurality of slider pins;

a pair of spaced slider rails having a plurality of holes;

said plurality of slider pins movable within each of said plurality of holes, and said handle being connected to advance or withdraw said slider pins; and a mechanical mechanism associated with each of said slider pins including a spring clamp which is biased radially inwardly, and said slider pin including a wedged surface which is axially movable within said spring clamp, said wedged surface being positioned such that upon advancement of said slider pin into said holes in said slider rails, said wedge surface causes said spring clamp to increase its diameter and to be tightly received within said holes, and upon withdrawal of said slider pin from said holes said spring clamp is biased radially inwardly to decrease its diameter and facilitate removal of said slider pins.

* * * * *

UNITED STATES PATENT AND TRADEMARK OFFICE
CERTIFICATE OF CORRECTION

PATENT NO. : 6,488,303 B1
DATED : December 3, 2002
INVENTOR(S) : Cobb

It is certified that error appears in the above-identified patent and that said Letters Patent is hereby corrected as shown below:

Column 4,
Line 39, "actuation" should be -- mechanical --
Line 46, insert -- mechanical -- after "said" and before "mechanism"

Signed and Sealed this

First Day of April, 2003

JAMES E. ROGAN
*Director of the United States Patent and Trademark Office*